United States Patent [19]
Heslot et al.

[11] Patent Number: 5,639,667
[45] Date of Patent: Jun. 17, 1997

[54] PROCESS AND DEVICE FOR MONITORING BY PERIODIC EXCITATION A FLOW OF PARTICLES IN A PIPE

[75] Inventors: François Heslot, Viroflay; Claude Beauducel, Henonville, both of France

[73] Assignee: Institut Francais du Petrole, Rueil Malmaison, France

[21] Appl. No.: 493,322

[22] Filed: Jun. 21, 1995

[30] Foreign Application Priority Data

Jun. 21, 1994 [FR] France ................... 94 07695

[51] Int. Cl.$^6$ ................... G01F 1/66; G01P 5/18
[52] U.S. Cl. ................... 436/148; 422/81; 422/82.13; 436/43; 436/52; 73/861.18; 73/861.23; 73/861.25
[58] Field of Search ................... 436/43, 50, 52, 436/55, 148; 422/81, 82.13; 73/861.18, 861.23, 861.25

[56] References Cited

U.S. PATENT DOCUMENTS

| | | | |
|---|---|---|---|
| 3,496,771 | 2/1970 | Moffatt | 73/194 |
| 4,506,541 | 3/1985 | Cunningham | 73/32 R |
| 4,596,254 | 6/1986 | Adrian et al. | 128/666 |
| 4,598,593 | 7/1986 | Sheen et al. | 73/861.04 |
| 4,884,457 | 12/1989 | Hatton | 73/864.04 |
| 4,930,343 | 6/1990 | Johnson | 73/196 |
| 4,958,524 | 9/1990 | Bonner er al. | 73/861.18 |
| 4,970,902 | 11/1990 | Misumi et al. | 73/861.23 |
| 5,199,306 | 4/1993 | Hunter | 73/861.63 |
| 5,426,982 | 6/1995 | Buisson et al. | 73/861.04 |
| 5,454,271 | 10/1995 | Yamamoto et al. | 73/861.04 |

FOREIGN PATENT DOCUMENTS

| | | |
|---|---|---|
| 2699274 | 6/1994 | France . |
| 93 14382 | 7/1993 | WIPO . |

Primary Examiner—Long V. Le
Attorney, Agent, or Firm—Antonelli, Terry, Stout & Kraus, LLP

[57] ABSTRACT

In a pipe containing a fluid wherein particles circulate, at least one detector is attached. The detector includes a cavity in fluid communication with the pipe by a vent whose section, at least at an opening for fluid communication with a pipe is of the same dimensions as that of the circulating particles. A periodic exciter such as a source of acoustical waves or a generator of the periodic motion piston type suitable for inducing alternate pressure variations in the fluid in the cavity is coupled with the cavity. The excitation frequency can be selected in keeping with a resonance frequency of the cavity. Signals representative of the pressure variations of the excited fluid, resulting from flowing of the particles past the opening of each vent are measured. Processing of the signals allows the velocity of the particles to be determined. Other parameters of the particles can be determined by means of two distinct detectors coupled with the pipe. The detector may be used for monitoring the flow of catalytic particles in continuous reforming plants, for example.

23 Claims, 3 Drawing Sheets

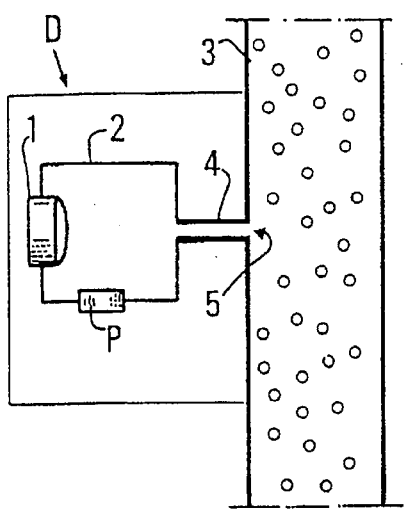
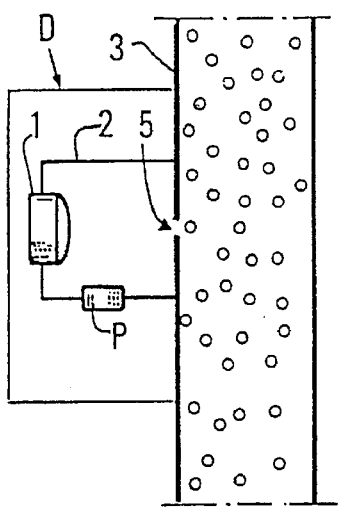
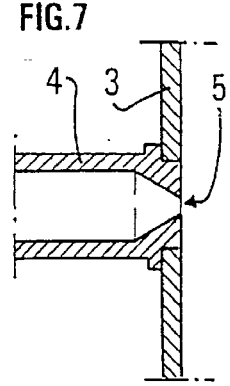
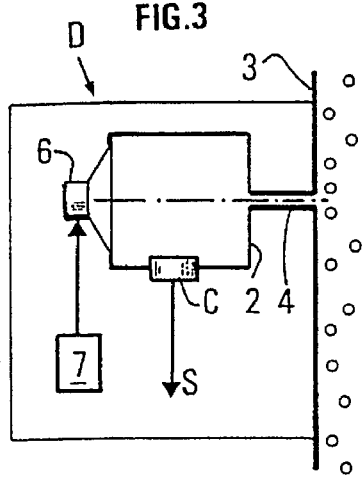
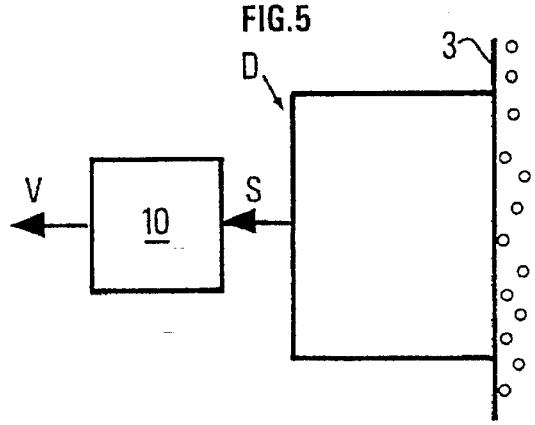
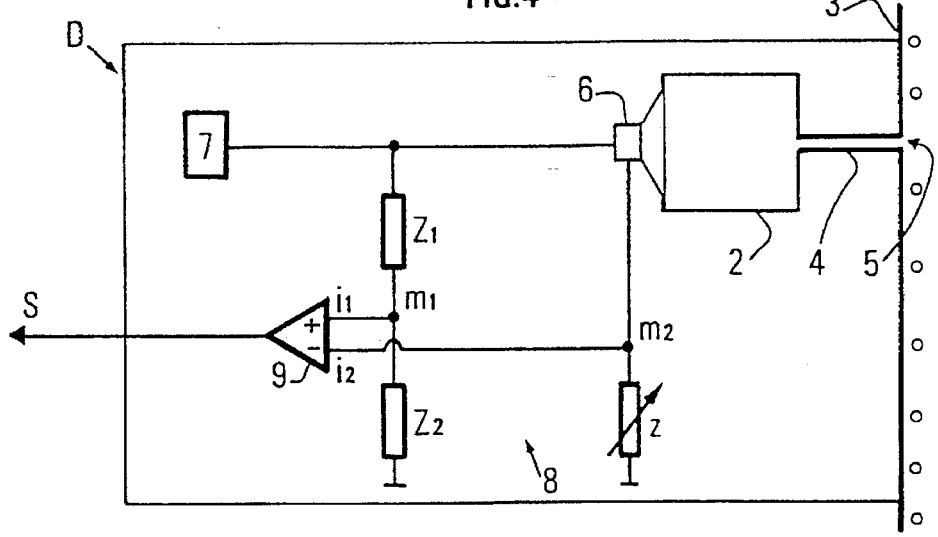

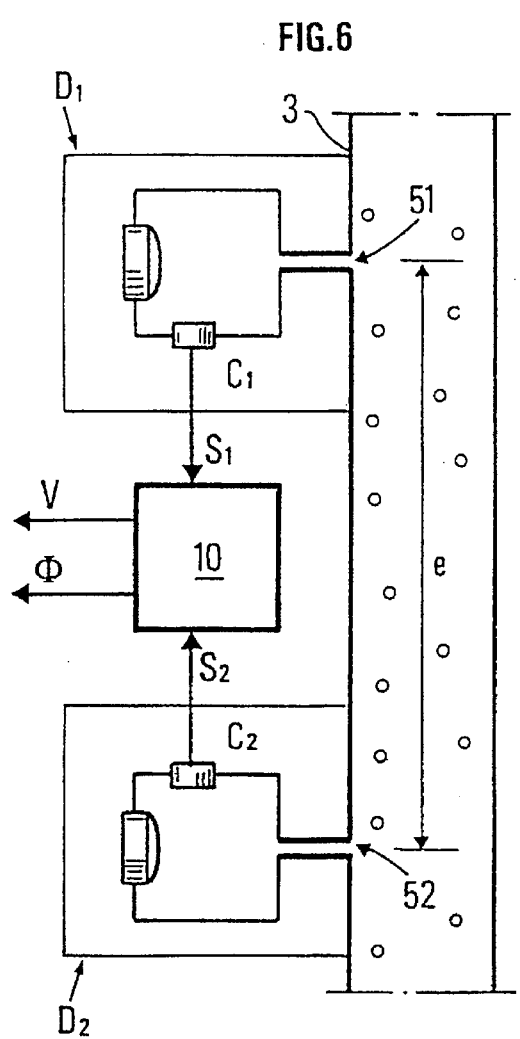
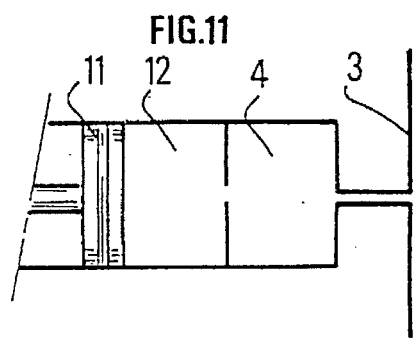
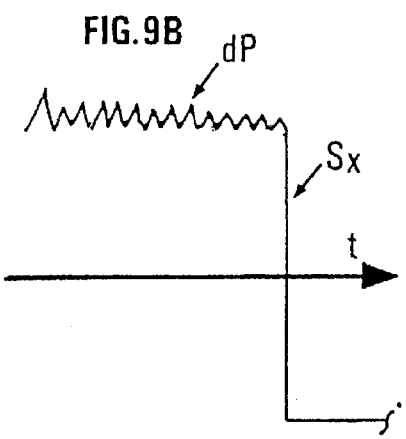
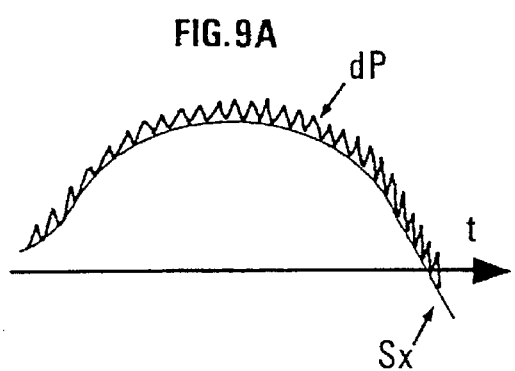
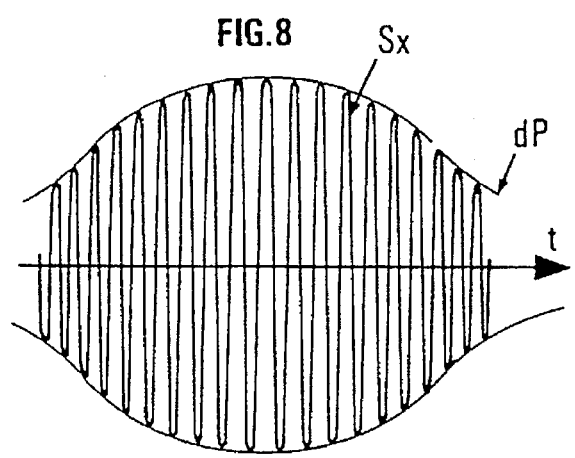

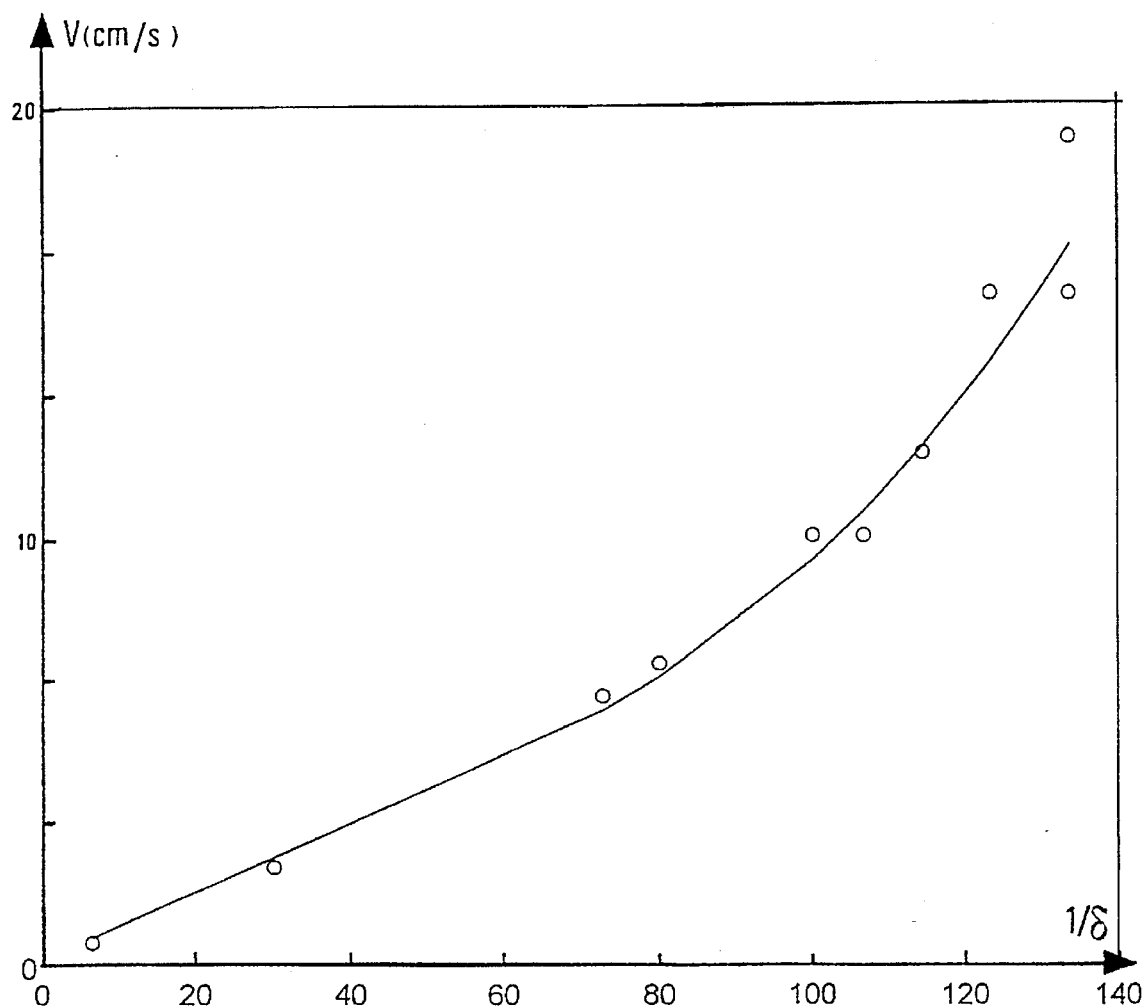

PROCESS AND DEVICE FOR MONITORING BY PERIODIC EXCITATION A FLOW OF PARTICLES IN A PIPE

FIELD OF THE INVENTION

The present invention relates to a process and to a device for monitoring a flow of particles or pellets circulating in a pipe containing a fluid. What is referred to as monitoring is detecting continuously the flow of the particles and the flow variations, as well as determining some of the characteristics thereof. The process is notably suited for determining the velocity and/or the section of the particles circulating continuously or discontinuously in pipes.

BACKGROUND OF THE INVENTION

The invention can notably apply to the field of continuous reforming where a catalyst which comes in the form of pellets of substantially equal diameter passes through a chain of reactors arranged vertically. At the base of each one of them, they enter a transfer device known in the technique as a lift pot where they are mixed with a fluid under pressure (hydrogen for example) and blown through a tube towards the upper inlet of the next reactor. At the end of this chain, the catalyst pellets are carried by a fluid current towards a regenerator and, once regenerated, they are again displaced along the chain of reactors. Such a continuous reforming process is for example described in patent U.S. Pat. No. 4,172,027.

During these continuous reforming cycles, a degradation of the catalyst along the circuit followed thereby is generally observed (a phenomenon referred to as attrition). Transportation by blowing causes a crumbling, a bursting of the catalyst pellets and the formation of dust depositions on the grates inside the reactors. The circulation of the catalyst particles in the pipes is modified thereby. It is therefore useful to measure the rate of displacement of the particles in order to control the evolution of the process.

Patent application FR-A-2,699,274 describes a device for measuring flows of particles in a pipe, which implements a process for measuring pressure variations. One or several thin tubes or channels open into a pipe in which a flow of particles to be characterized circulates. The section of each tube is of the same order of magnitude as that of the circulating particles. A fluid is injected through each of these tubes at a predetermined rate and the variations in the pressure of the fluid, resulting from the flowing of the particles past the opening of each tube, are measured.

The velocity of the particles is determined for example by performing an autocorrelation of the signal indicating the pressure variations. Two thin channels, both supplied with fluid, can also open into two different points along the pipe, and the velocity and the section of the circulating particles can be determined by crosscorrelation of the signals indicating respectively the pressure variations in each of the tubes.

The previous device gives precise measurements. However, the implementation thereof requires tanks delivering a fluid at a controlled rate. In some cases: unavailable fluid reserve or incompatibility between the fluid available and those circulating in pipes while carrying along the particles, its implementation may present drawbacks.

SUMMARY OF THE INVENTION

The process according to the invention allows a flow of particles or pellets circulating in a pipe containing a fluid to be monitored while avoiding the drawbacks linked to the use of a continuous fluid injection. It comprises:

using at least one detector comprising a cavity communicating with the pipe through a vent whose section, at least at the level of its opening for communication with the pipe, is of the same order of magnitude as that of the circulating particles, and an excitation means coupled with the cavity for generating pressure variations in the fluid, and measuring the signals representative of the variations in the pressure of the excited fluid, modified by the flowing of the particles past the opening of each vent.

The process can also comprise a processing of the signals obtained (such as an autocorrelation) so as to deduce therefrom at least one parameter characteristic of the flow of particles (their velocity for example).

According to an embodiment, the process comprises the separate measurement, by two detectors communicating with the pipe at different points along the pipe, of the signals representative of the variations in the pressure of the excited fluid, modified by the flowing of the particles past the openings of the respective vents thereof, the distance between the two openings being selected short enough for the configuration of the particles to remain substantially identical as they flow successively past one and the other, as well as the determination of the velocity of the particles and of their section, by correlation of the various signals measured.

The excitation means can be suited for working at a frequency in keeping with the resonant frequency of the cavity.

The invention also relates to a device for monitoring a flow of particles or pellets circulating in a pipe. It comprises one or several detection units such as those defined above, each with means for measuring the signals representative of the variations in the pressure of the excited fluid, modified by the flowing of the particles past the opening of its vent, and possibly processing means such as a computing device programmed to perform an autocorrelation of each measuring signal, so as to determine at least one parameter characteristic of the circulation of the particles (their circulation rate for example).

According to another embodiment, the device comprises at least two detection units whose respective vents open into the pipe at different points thereof and, in this case, the processing means are suited for performing a separate and a joint processing of the different signals obtained, in order to obtain several characteristics of the flow. It can be for example an autocorrelation of each measuring signal and/or a crosscorrelation of the signals measured by each of the two units in order to determine several parameters characteristic of the flow of particles, for example their velocity, their rate of flow, their section, etc.

The excitation means can be a source of acoustic waves comprising for example a vibrator co-operating with a signal generator, or a periodic pressure generator such as a piston sliding in a cylinder communicating with the cavity and motive means for displacing this piston in the cylinder alternately in one direction and in the opposite direction.

The means for measuring the signals can comprise at least one pressure detector associated with each cavity, or elements for detecting variations in the working of the excitation means, resulting from the flowing of the particles through the pipe, and notably elements for measuring the variations in the electroacoustic impedance of the excitation means concomitant with the variations in the acoustic coupling coefficient of the cavity with the pipe, caused by the flowing of the particles past the opening of the vent.

The monitoring device according to the invention, used as a means for detecting the flows of particles as well as used in a complementary way as a means for possibly measuring these flows, only requires a simple equipment, little sensitive to temperature variations, and which totally differs from the previous use requiring an equipment for delivering a controlled and continuous flow of fluid.

BRIEF DESCRIPTION OF THE DRAWINGS

Other features and advantages of the process and of the device according to the invention will be clear from reading the description hereafter of embodiments given by way of non limitative examples, with reference to the accompanying drawings in which:

FIGS. 1 and 2 are simplified diagrams illustrating the detection principle according to the invention, FIG. 3 shows a variant of the previous embodiment, where the source of elastic waves consists of a loudspeaker, FIG. 4 shows a second embodiment where the measuring signals are detected indirectly from the source of waves, FIG. 5 shows the association of a detector with means for processing the signals detected, FIG. 6 shows a third embodiment comprising two distinct detectors and which allows the flow of particles to be better characterized, FIG. 7 shows a detail of the opening of each vent, FIG. 8 diagrammatically shows an example of modulation of a pressure variation induced by the flowing of the particles past a vent, in the case where the period of the fluid excitation signal is much less than the time interval between the successive particles, FIGS. 9A, 9B diagrammatically show two analogous examples of modulation of an excitation signal through the flowing of particles past a vent, in the case where the period of the signal (sinusoidal, FIG. 9A and square, FIG. 9B) is, unike the previous one, much greater than the time interval between the successive particles, FIG. 10 shows a calibration curve linking the velocity to the width of the autocorrelation peaks, and FIG. 11 diagrammatically shows the case where the excitation means is a piston sliding in a cylinder communicating with the cavity, in a periodic, possibly very slow motion.

DESCRIPTION OF THE PREFERRED EMBODIMENTS

The process according to the invention described hereafter is implemented for monitoring a flow of particles in a pipe 3 containing a fluid. It comprises a detector D consisting of an excitation means 1 coupled with a cavity 2 that is provided with means for communication with pipe 3. The excitation means 1 is suited for inducing periodic pressure variations in the fluid. Detector D also comprises pressure measurement means P for detecting the variations in the pressure of the excited fluid in cavity 2, which are modified by the flow of the particles. The previous detector D can be completed by means for determining, from the pressure variations detected, at least one parameter indicative of the flow of particles in the pipe.

Vent 4 can consist of a tube opening into pipe 3 by an opening 5 (FIG. 1). In case the cavity is directly adjacent to pipe 3, this vent can be limited to a simple opening (FIG. 2).

In order to cause the effect of the flowing of the particles to be more significant, one preferably chooses a vent 4 whose section, at least in the neighbourhood of opening 5, is of the same order of magnitude as that of the circulating particles and preferably less. A vent 4 communicating with the pipe through an opening whose section ranges between ⅓ and ⅒th of the section of the particles is for example used. Each vent can consist of a tube of uniform section or of a tube (FIG. 7) with a truncated-cone-shaped end part opening by a calibrated opening into pipe 3.

In order to increase even further the amplitude of the effects produced by the flowing of the particles past opening 5, it is possible to use an excitation means 1 emitting waves at a frequency selected according to the resonant frequency of the cavity 2 charged by the source and extended by its vent 4.

According to the embodiment of FIG. 3, the excitation means of each flow detector D consists of a source of acoustic waves comprising a vibrator 6 of any type such as an electrodynamic loudspeaker, a piezoelectric or magnetostrictive vibrator, etc, coupled to cavity 2, to which the signal emitted by a generator 7 is applied. The frequency of the signal applied to vibrator 6 can be chosen for example equal or close to the resonant natural frequency of cavity 2, provided or not, as the case may be, with its vent 4. The particles that flow in pipe 3 past the opening 5 of the vent modify the acoustic coupling of the cavity, which leads to a variation in the acoustic pressure measured by a detector C.

The envelope of the pressure signal measured shows amplitude variations dP whose form depends on the velocity of the particles and on the dimensions thereof (FIGS. 8, 9A, 9B). The width of the peaks grows like the ratio D/V where D is the section of the particles and V their average velocity.

According to the embodiment of FIG. 4, the pressure variations in the cavity, caused by the flowing of the particles past the opening of vent 4, are measured indirectly. Since the flowing of the particles past the opening leads to a variation in the acoustic coupling coefficient of vibrator 6 with the cavity, a concomitant variation in its electric impedance occurs. It can be detected by any well-known means and notably with a measuring bridge 8 charging generator 7 and with a differential amplifier 9.

A first arm of bridge 8 comprises in series two impedances Z1, Z2. A second arm of the bridge comprises the vibrator 6 in series with an adjustable resistance z. The two midpoints m1, m2 of the bridge are connected to the two inputs i1, i2 of amplifier 9. The vibrator being acoustically coupled with the cavity and its vent, and excited at the selected frequency, the adjustable resistance z is so adjusted that the bridge is balanced in the absence of any flow of particles in pipe 3. When a flow of particles circulates in the pipe, a signal S whose envelope is representative of this flow is obtained at the output of the differential amplifier (see FIG. 8).

By associating with each detector D particular computing means 10 (FIG. 5) such as a microcontroller, a device for measuring at least one significant parameter of the flow can be constituted.

If the particles circulating in pipe 3 have substantially the same section D, it is possible to determine the velocity of the particles by programming the microcontroller to perform an autocorrelation of the signal representative of the pressure variations detected, and by measuring for example the width at half height, expressed in time, of the main correlation peak obtained.

A multinomial or exponential type variation law is established experimentally for example between the widths of the peaks at half height d and the flow rates measured in another well-known way, on a measurement site allowing a prior calibration. This law being established (FIG. 10), a determined velocity can be associated with each value of d obtained.

According to the embodiment of FIG. 6, the device can also comprise two similar flow detectors D1, D2 analogous to those described in FIGS. 1-4, which communicate with pipe 3 through two openings 51, 52 placed at a known distance from one another. The distance e between the two openings must preferably be very short, so that the configuration of the particles flowing past the first opening is not substantially modified when they flow past the other. The means C1, C2 for measuring the pressure variations of the two detectors D1, D2 deliver respectively signals S1, S2. After demodulation, these signals are acquired in parallel by a microcontroller 10 (by means for example of a multiplexer that is not shown) and combined with one another.

In this case, a crosscorrelation of these two signals is performed. The crosscorrelation signal has a main peak that exhibits a lag of a time interval with respect to the origin of times, which is equal to the time taken by the particles to cover the distance between the two openings 51, 52. The distance e between the two openings 51, 52 being known, the measurement of this time interval allows to determine the first parameter, i.e. the average velocity V of the particles during the time interval during which the signals S1 and S2 are acquired. The average velocity V of the particles being known by measuring this time lag, the measurement of the width of the main peak of the crosscorrelation function allows the section of the particles circulating in pipe 3 to be deduced.

Embodiments where the excitation means is a source 1, 6 of acoustic waves of the electrodynamic, piezoelectric, magnetostrictive type, etc, have been described.

Without departing from the scope of the invention, these source types can be replaced more generally by a fluid displacement means moving in any periodic motion: sinusoidal, crenellated, sawtoothed, etc, whose frequency can be selected from the infrasound range (the frequency can come down to a fraction of a Hertz), from the audio-acoustic range or from the ultrasound band.

This displacement means can consist (FIG. 11) of a piston 11 that can slide in a cylinder 12 and moves in a periodic motion at a well determined frequency. This alternate displacement frequency can possibly be brought down to a fraction of a Hertz for certain applications.

We claim:

1. A process for monitoring a flow of particles or pellets with dimensions in a certain range, circulating in a pipe containing a fluid, comprising:
   using at least one detector comprising a cavity opening in and acoustically coupled with the pipe through a vent whose section, at least at an opening for fluid communication with the pipe, is of a same order of magnitude as the dimensions of said particles, and an excitation means coupled with the cavity for generating periodic pressure variations in fluid inside the cavity and
   measuring signals indicative of pressure variations of the fluid in the cavity resulting from variations of the acoustic coupling of the cavity with the pipe when particles flow in the pipe past the opening of the vent and determining therefrom at least one parameter indicative of the flow of particles.

2. A process as claimed in claim 1 further comprising determining particle velocity in the pipe by autocorrelating said signals.

3. A process for monitoring a flow of particles or pellets with dimensions in a certain range, circulating in a pipe containing a fluid, comprising:
   using at least two detectors each comprising a cavity opening in and acoustically coupled with the pipe through a vent whose section, at least at an opening for fluid communication with the pipe, is of a same order of magnitude as the dimensions of said particles, and an excitation means coupled with each of said cavities for generating periodic pressure variations in fluid inside the cavities and the at least two detectors communicating with the pipe at different points along the pipe,
   separately measuring signals indicative of pressure variations of the fluid in the cavity of each detector resulting from variations of the acoustic coupling of each cavity with the pipe when particles flow in the pipe past the opening of the corresponding vent and determining therefrom at least two parameters indicative of the flow of particles.

4. A process as claimed in claim 3 further comprising correlating the different signals measured and determining therefrom velocity of the particles as well as section of said particles.

5. A process as claimed in claim 3, further comprising generating the periodic pressure variations at a frequency close to a resonance frequency of each cavity.

6. A device for monitoring a flow of particles or pellets with dimensions in a certain range, circulating in a pipe containing fluid, which comprises at least one detector comprising a cavity opening in and acoustically coupled with the pipe through a vent whose section, at least at an opening for fluid communication with the pipe, is of a same order of magnitude as the dimensions of said particles, and an excitation means with a certain electroacoustic impedance which is coupled with the cavity for generating periodic pressure variations in the fluid inside the cavity, means for measuring signals indicative of pressure variations of the fluid in the cavity resulting from variations of the acoustic coupling of the cavity with the pipe when particles flow in the pipe past the opening of the vent, and processing means for determining therefrom at least one parameter indicative of the flow of particles.

7. A device as claimed in claim 6, wherein the processing means includes a computing device programmed to perform an autocorrelation of the at least one measuring signal so as to determine the velocity of the particles in the pipe.

8. A device for monitoring a flow of particles or pellets with dimensions in a certain range, circulating in a pipe containing a fluid which comprises at least two detectors each comprising a cavity opening in and acoustically coupled with the pipe through a vent whose section, at least at an opening for fluid communication with the pipe, is of a same order of magnitude as the dimensions of said particles, and the at least two detectors communicating with the pipe at different points along the pipe, excitation means with a certain electroacoustic impedance which is coupled with said cavities for generating periodic pressure variations in the fluid inside the cavities, means for measuring signals indicative of pressure variations of the fluid in the cavities resulting from variations of the acoustic coupling of the cavities with the pipe when particles flow in the pipe past the opening of the vent, and processing means for determining therefrom at least two parameters indicative of the flow of particles.

9. A device as claimed in claim 8, wherein the processing means includes a computing device programmed to perform an autocorrelation of each measuring signal and/or a crosscorrelation of the signals so as to determine velocity and dimensions of the particles in the pipe.

10. A device as claimed in claim 6, wherein the excitation means includes a vibrator acoustically coupled with the cavity.

11. A device as claimed in claim 8, wherein the excitation means includes a vibrator acoustically coupled with each cavity.

12. A device as claimed in claim 6, wherein the excitation means includes a periodic pressure generator acoustically coupled with the cavity.

13. A device as claimed in claim 8, wherein the excitation means includes a periodic pressure generator acoustically coupled with each cavity.

14. A device as claimed in claim 12, wherein the periodic pressure generator comprises a cylinder in fluid communication with the cavity, a piston sliding in the cylinder and motive means for reciprocating the piston in the cylinder.

15. A device as claimed in claim 13, wherein the periodic pressure generator comprises a cylinder in fluid communication with at least one cavity, a piston sliding in the cylinder and motive means for reciprocating the piston in the cylinder.

16. A device as claimed in claim 6, wherein the means for measuring the signals comprise at least one pressure detector associated with the cavity.

17. A device as claimed in claim 8, wherein the means for measuring the signals comprise at least one pressure detector associated with each cavity.

18. A device as claimed in claim 6, wherein the means for measuring the signals includes elements for detecting variations of the pressure variations in the fluid generated by excitation means resulting from particles flowing along the pipe.

19. A device as claimed in claim 8, wherein the means for measuring the signals includes elements for detecting variations of the pressure variations in the fluid generated by excitation means resulting from particles flowing along the pipe.

20. A device as claimed in claim 6, wherein the means for measuring the signals includes elements for measuring variations in the electroacoustic impedance of the excitation means concomitant with the variations in the acoustic coupling of the cavity with the pipe, due to the flowing of the particles past said opening.

21. A device as claimed in claim 8, wherein the means for measuring the signals includes elements for measuring variations in the electroacoustic impedance of the excitation means concomitant with the variations in the acoustic coupling of each cavity with the pipe, due to the flowing of the particles past each of said openings.

22. A device as claimed in claim 6, wherein the excitation means is suited for working substantially at a resonance frequency of the cavity.

23. A device as claimed in claim 8, wherein the excitation means is suited for working substantially at a resonance frequency of each cavity.

* * * * *